Sept. 24, 1935.   H. KOHN   2,015,638
TRANSMISSION GEAR
Filed Sept. 8, 1933   2 Sheets-Sheet 1
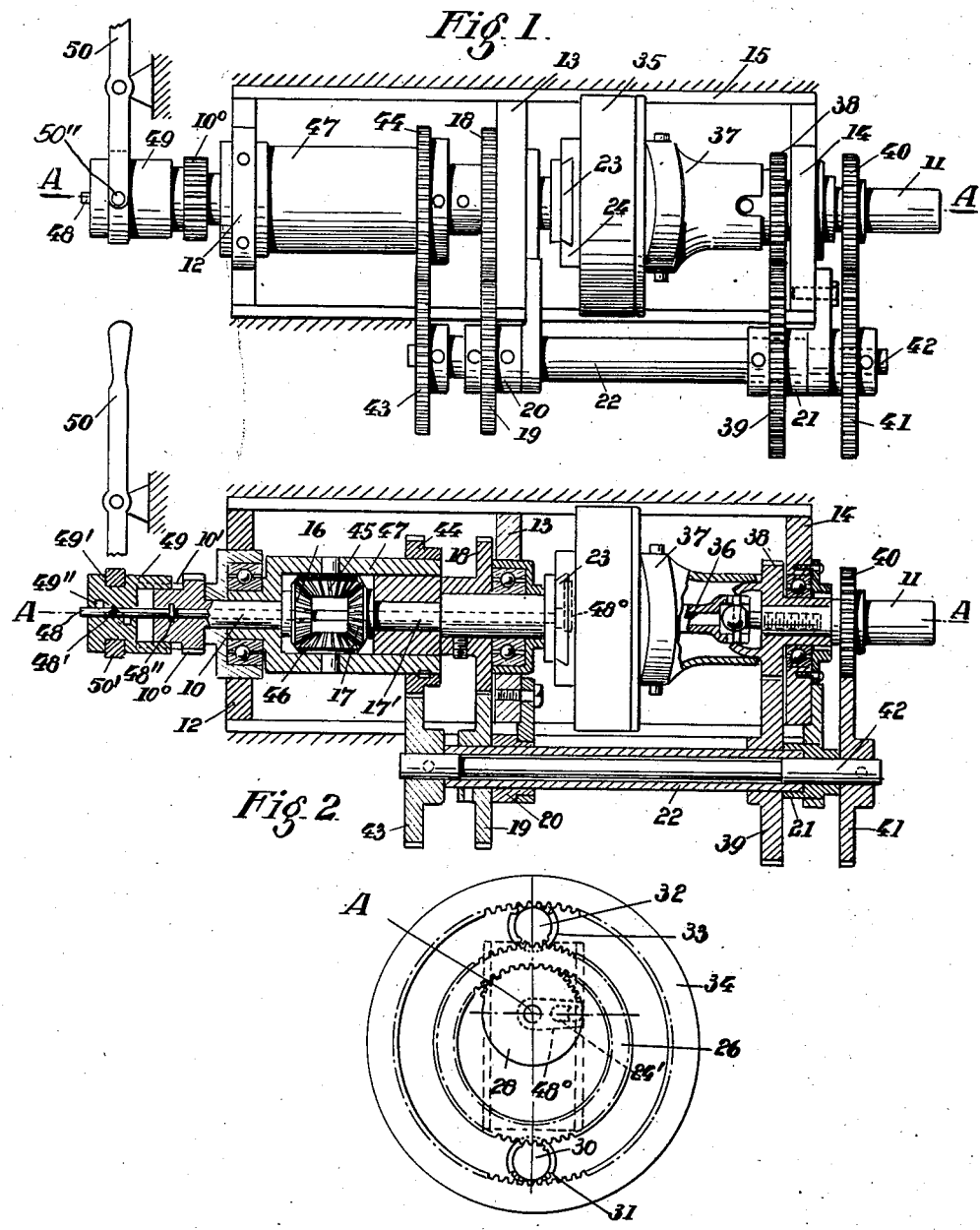

Sept. 24, 1935.                H. KOHN                  2,015,638
                          TRANSMISSION GEAR
                        Filed Sept. 8, 1933      2 Sheets-Sheet 2

Inventor:
Hans Kohn
By Knight Bros
His Attorneys

Patented Sept. 24, 1935

2,015,638

UNITED STATES PATENT OFFICE 2,015,638

TRANSMISSION GEAR

Hans Kohn, Stoetten O. A. Geislingen, Germany

Application September 8, 1933, Serial No. 688,668
In Germany September 13, 1932

19 Claims. (Cl. 74—283)

The invention relates to variable speed transmission gears and more particularly to a variable speed gear which delivers uniform torque at all adjustments, and the transmission ratio of which is variable continuously between fixed limits, and moreover, one in which all the wheels remain always completely in engagement. In the gear according to the invention, all the parts are always in full operation, there being no intermittently operating members, nor members which co-operate or engage with other members at certain times but are dissociated or disengaged from them at other times, all of the parts operating continually and continuously. Variable gear according to the invention may be broadly stated to consist of two coacting epicyclic gears connected to the same driven shaft, means being provided for varying the inter-relations between these gears so as continuously to vary the speed of said driven shaft. One of the epicyclic gears may be radially adjustable and arranged so as to act upon the other or differential gear, the wheels of the epicyclic gear rolling with respect to one another according to the eccentricity of their adjustment in such a manner that in the limiting conditions one wheel or the other alone rolls with respect to the other, the wheels, however, rolling mutually at intermediate adjustments. The wheels of the epicyclic gear are respectively directly and indirectly under the influence of the resistive torque on the driving shaft. This epicyclic gear is, for example, connected between the driven member of the differential gear and the member carrying the planet wheel of the same, the epicyclic gear being situated in an extension of the direction of the main shaft of the differential gear or of the driving and driven shafts. The mutual rolling of the one wheel, more particularly of the wheel directly subjected to the torque, is preferably brought about by means of a part rotating on the eccentric member.

An example of the numerous possible constructions of the gear according to the invention is illustrated in the accompanying drawings, in which:—

Figure 1 illustrates the gear in plan view,

Figure 2 is a plan view, partly in section through the common axis of the driving and driven shaft, Figure 3 is a section on a larger scale through the epicyclic gear, while Figures 4 and 5 illustrate diagrammatically, the former on the same scale as Figure 3, the epicyclic gear in its two limiting positions as seen from the driven shaft side.

Figure 3:
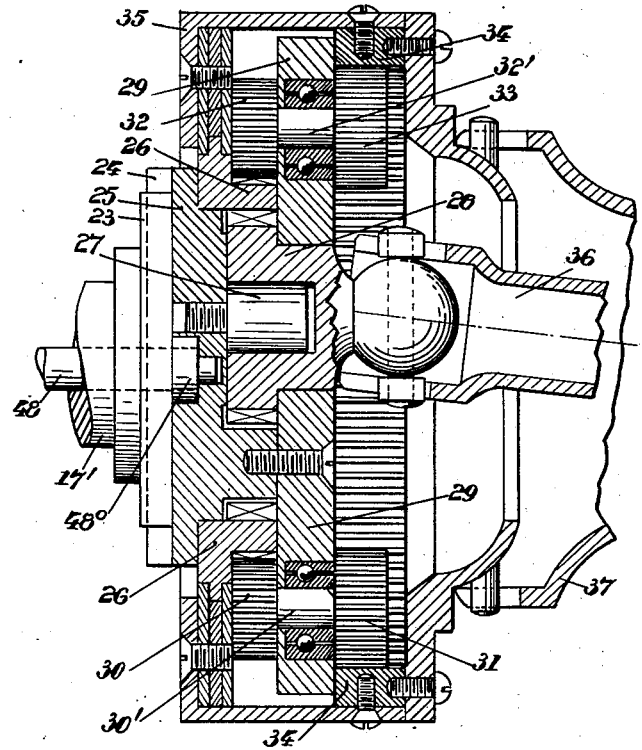

With reference to the drawings, the main shaft train 10—11 of the gear is carried in three bearings 12, 13 and 14 in a frame 15. In this main shaft train the member 10 is the driving member, that is the member by means of which the energy is supplied, for example by way of a gear wheel 10⁰. The member 11 is the driven member which supplies energy and to which the resistive torque is applied.

The driving shaft 10 has fixed on it the bevel wheel 16 of a differential gear, the driven wheel 17 of which drives a shaft 17'. The shaft 17' has fixed on it a gear wheel 18 which engages with a gear wheel 19 on an intermediate shaft 22 carried in bearings at 20 and 21. The shaft 17' has fixed on it a plate 23 which, by means of dovetails or in any other desired manner, acts as a guide for a slide 24 which is displaceable in a radial direction with respect to the guide plate 23. The slide 24 is formed, on its side remote from the guide plate 23, as a disc-like member 25, the periphery of which forms a bearing for a toothed ring 26 having internal and external teeth and on which bearing the ring may rotate freely. A pin 27 is fixed on the disc portion 25 of the slide 24 and displaced from its centre, on which pin a planet wheel 28 rotates freely. The disc portion 25 overlaps the toothed ring 26 outwardly at 29 in such a manner that double pinions 30, 31 and 32, 33, fixed on the common shafts 30' or 32' respectively, can be mounted in bearings in it, the pinions 30 and 32 engaging in the external teeth of the toothed ring 26 while the other coaxial pinions 31 and 32 engage in an internally toothed ring 34 on a casing 35 surrounding the slide gear, which casing is mounted so as to be freely rotatable on the toothed ring 26. The pinion 32 and the planet pinion 28 are both mounted on the same radius of the member 25, 29, so that the points of engagement of the planet wheel 28 and of the toothed ring 26 are at a constant distance on this radius.

The planet wheel 28 turns the driven shaft 11 directly by means of an articulated shaft or the like 36. Similarly, the casing 35 is connected by means of a sleeve-like articulated shaft 37, which surrounds the articulated shaft 36, with a gear wheel 38 which is freely mounted on the driven shaft 11. The gear wheel 39 engages with this gear wheel 38 and is fixed on the intermediate shaft 22. It is therefore connected with the gear wheel 18 by way of the gear wheel 19 which is fixed to the same shaft 22. On the driven shaft 11 is fixed a gear wheel 40 with which engages a gear wheel 41 on a second intermediate shaft 42, which in the example illustrated passes through the hollow first intermediate shaft 22 and has fixed to its other end a gear wheel 43 which engages with a gear wheel 44. The gear wheel 44 is secured to the casing 47 which carries the rotating wheels 45, 46 of the differential gear, the rotary wheel carrier.

The transmission ratio is varied as a result of displacement of the slide 24 on its guide plate 23. This radial displacement of the slide 24 may be effected during the rotation of all parts, for example as illustrated, by means of a shaft 48 which passes through the hollow shafts 10 and 17. An angular displacement can be imparted to the shaft 48 with respect to the shafts 10 and 17 during rotation by means of a lever 50. For this purpose, the lever 50 engages with an annular groove 49' in a sleeve 49 by means of a ring 50' connected with the lever by pins 50", the sleeve 49 being guided axially in grooves 10' in the shaft 10 and therefore rotating with the shaft 10. This sleeve 49 has inclined grooves 49" in which engage pins 48' in the shaft 48, which shaft is secured against axial displacement at 48". The inner end of the shaft 48 passes through the guide plate 23 and engages, by means of a small crank or a cam 48⁰, in an opening 24' in the slide 24, which opening is somewhat elongated correspondingly in the radial direction.

If the slide 24 is so adjusted that the centre of the toothed ring 26 coincides with the axis A—A of the shaft train 10, 11 (Figure 4), then the driven shaft 11 is given its maximum speed. If, on the other hand, the slide 24 is so displaced on the guide plate 23 that the axis of the planet wheel 28 coincides with the axis A—A of the shaft train 10, 11 (Figure 5), then the driven shaft 11 remains stationary.

Figure 4:
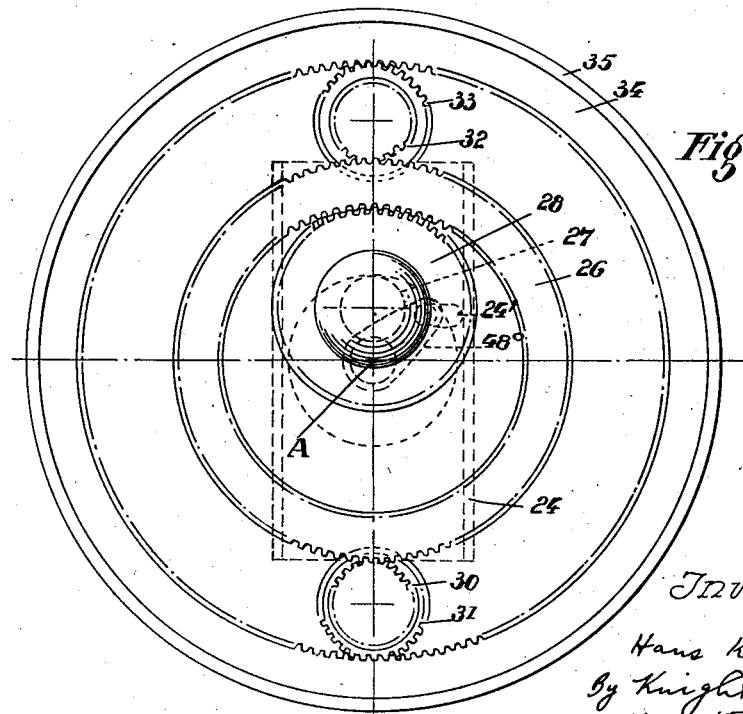

In the last-mentioned limiting case the toothed ring 26 rolls itself along on the wheel 28 by means of its internal teeth so that the wheel 28 becomes a stationary wheel, while in the other limiting position, which is illustrated in Figure 4, the wheel 28 rolls itself along the stationary toothed ring 26.

As a result of the planet wheel 28 remaining stationary (the limiting position according to Figure 5), the inner articulated shaft 36 and the driven shaft 11 which is connected to it also remain stationary. This shaft 11 is connected by the intermediate gear 40, 41, 42, 43, 44 with the rotary wheel carrier 47. As, therefore, this carrier 47 is also stationary, the rotary motion of the driving shaft 10 is thus transmitted at the full speed to the gear wheel 17 by way of the wheels 45, 46. The shaft 17' with the slide 23 and its member 25, 29, therefore rotates rapidly. The shafts of the pinions 30, 31, 32, 33, which are mounted in bearings in the member 29, naturally revolve in a circular path at the same number of revolutions as the plate 25, 29. If the casing 35 connected to the outer articulated shaft 37 were to rotate at the same speed as the plate 25, 29, the toothed ring 26 would be carried round by the pinions 30, 31, 32, 33 at the same rotary speed as that of the member 25, 29. Now the number of external teeth on the toothed ring 26 is less than the number of teeth on the larger internally-toothed ring 34, and the speed of revolution of the pinion shafts is the same as that of the member 25, so that the outer ring 34, 35, because of its greater diameter, must run faster than the double toothed ring 26, in order to bring about a complete rolling of the toothed ring 26 on the wheel 28, whereby the latter, as there is no resistance to its movement at the internal teeth of the toothed ring 26, is compelled to become stationary. This complete rolling of the toothed ring 26 on the wheel 28, is brought about by reason of the fact that the casing 34, 35 is connected with the intermediate gear 38, 39, 19, 18 by means of the articulated sleeve 37. The wheels 38, 39 of this intermediate gear are such that the wheel 38 runs faster than the wheel 18.

The other limiting case is that in which the driven shaft 11 is given the maximum number of revolutions. In this case the revolutions of the driving shaft 10 distribute themselves between the rotary wheel carrier 47 and the shaft 17'. In view of the intermediate gear 44, 43, 42, 41, 40, the number of revolutions of the rotary wheel carrier 47 corresponds to the number of revolutions of the driven shaft 11. Although the rotary wheel carrier 47 rotates at its maximum speed, part of the revolutions of the shaft 10 is, as aforesaid, transmitted by way of the wheels 45 and 46, to the wheel 17 and the shaft 17' which, however, now runs substantially slower than in the other limiting case in which the rotary wheel carrier 47 is stationary. In the present limiting case, in which the centre of the toothed ring 26 coincides with the axis A—A of the shaft train 10, 11, and therefore the planet wheel 28 is displaced from the centre (Figure 4), the wheel 28 rolls on the internal teeth of the ring 26. This toothed ring 26 is now prevented from rotating by the toothed gear engaging in its external teeth—the pinions 30, 31, 32, 33 and the internally toothed ring 34 of the casing 35, for the casing is acted upon by way of the articulated shaft 37, and the intermediate gear 38, 39, 22, 19 by the gear wheel 18 of the driven wheel 17 of the differential gear in such a manner that the toothed ring 26 cannot follow the planet wheel 28.

The member 25, 29 also rotates with the shaft 17 (but slower than in the limiting case of Figure 5). Now, however, as a result of the transmission between the wheels 38, 39, the speed of rotation of the casing 35 is greater than that of the slide member 25, 29 to the extent that the toothed ring 26 is held back to such an extent that the planet wheel 28 endeavours to take it up in the opposite direction of rotation. Thus, the toothed ring 26 becomes a stationary member, around which the point of engagement of the planet wheel 28 in the internal teeth 26, and the points of engagement of the pinions 30, 32 in the external teeth of the ring 26—and in fact of all points of engagement in the same radial plane—revolve continuously.

In the limiting case illustrated in Figure 5 the plate member 25, 29 is, as regards the planet wheel 28, merely a bearing member that rotates round this wheel without effect, because the centre of the wheel 28 coincides with the axis A—A of the shaft train 10. On the other hand, the plate 25, 29 is in this position an eccentric body with respect to the toothed ring 26, and swings this ring round with it and thus causes rolling of the ring about the planet wheel 28.

In the other limiting case, that of Figure 4, on the other hand, the plate member 25, 29 forms, with respect to the toothed ring 26, a bearing member rotating ineffectually in the interior of this ring, while this member 25, 29 is a crank disc or an eccentric as regards the planet wheel 28 which causes this planet wheel to roll along in the interior of the toothed ring 26. In positions intermediate these two limiting positions, the rolling of one of the two wheels 26, 28 with respect to the other takes place to the extent that the member 25, 29 acts as an eccentric regarding the wheel 26 or 28.

It will be seen that the gear involves the principle of distributing, as desired, the revolutions made by the driving shaft between the parts of a differential gear or the like, in the example described between the parts 17' and 47, in such a manner that the speed of the rotary wheel carrier 47 increases continuously from zero to its maximum, all the toothed wheel gears which are in engagement with one another remaining continuously in engagement. The variation in the speed of the rotary wheel carrier 47 and therefore of the driven shaft 11 is brought about by means of a rotating toothed wheel gear 26, 28, one or other of the two wheels being stationary alternately in each of the two limiting cases while the other takes over the full rolling motion. In intermediate positions, on the other hand, a simultaneous mutual rolling of the two wheels 26, 28 takes place.

The scope of the invention is not limited to the details of the constructional example described which may be varied both as regards the construction and arrangement of its individual parts. For example, the gear may be so constructed that the parts of the intermediate shafts 22, 42 are also displaced in the axial direction A—A.

I claim:—

1. In an apparatus of the class described, a driven shaft, a variable-speed gear comprising a differential gear and an epicyclic gear including at least two continuously interengaging wheels, both said gears being connected to said driven shaft, means whereby said epicyclic gear acts on part of said differential gear, and means whereby said two interengaging wheels are respectively directly and indirectly acted upon by the resistive torque of the driven shaft, said epicyclic gear being adjustable so that its wheels roll with respect to one another according to the eccentricity of the adjustment of said interengaging wheels whereby said driven shaft may be rotated at a speed that is continuously variable within limits.

2. In an apparatus of the class described, a driven shaft, a variable-speed gear comprising a differential gear including driving and driven wheels and at least one planet wheel engaging them and mounted on a rotary carrier, and an epicyclic gear including at least two continuously interengaging wheels, both said gears being connected to said driven shaft, and said epicyclic gear being connected between said driven differential wheel and said rotary carrier, and means whereby said two interengaging wheels are respectively directly and indirectly acted upon by the resistive torque of the driven shaft, said epicyclic gear being adjustable so that its wheels roll with respect to one another according to the eccentricity of the adjustment of said interengaging wheels whereby said driven shaft may be rotated at a speed that is continuously variable within limits.

3. A variable-speed gear according to claim 2, in which said epicyclic gear consists of an internally toothed ring and a planet pinion engaging therein, said toothed ring being rotatably connected with said driven differential wheel, and said planet pinion being rotatably connected with said rotary carrier.

4. A variable-speed gear according to claim 2, in which said epicyclic gear is arranged between the coaxial driven differential wheel and said driven shaft, said epicyclic gear being mounted on a member that is connected for rotation with said driven differential gear by means of a slide and said planet pinion being connected for rotation with said driven shaft, said member being displaceable so as to make either said toothed ring or said planet wheel coaxial with said driven differential wheel and said driven shaft, or brought into any intermediate position whereby said driven shaft may be rotated at a speed that is continuously variable within limits.

5. A variable-speed gear according to claim 2, in which said epicyclic gear consists of an internally and externally toothed ring and a planet pinion engaging in the internal teeth thereof, said toothed ring being rotatably connected externally by means of a pinion with said driven differential wheel, and said epicyclic gear being mounted on a rotary member that is connected for rotation with said driven differential gear, said member carrying said pinion and said planet pinion on the same radius of said member, so that the points of engagement of the teeth of said planet pinion and said toothed ring are at a constant distance on the said radius.

6. A variable-speed gear comprising driving and driven shafts, a differential gear including driving and driven wheels and at least one planet wheel engaging them and mounted on a rotary carrier, a member carrying an epicyclic gear including a rotatable internally and externally toothed ring and a planet pinion continuously engaging the internal teeth of said ring, a casing rotatably mounted on said member coaxial with said ring, internal teeth on said casing, at least one pinion interconnecting the internal teeth of said casing with the external teeth of said toothed ring, said pinion being carried on a shaft mounted on said member, means whereby said planet pinion is connected for rotation with said driven shaft, means rotatably connecting said casing with said driven differential wheel, means rotatably connecting said rotary carrier with said driven shaft, said member being displaceable with respect to said driven shaft so that either said planet pinion or said toothed ring may be made coaxial therewith or brought into any intermediate position whereby said driven shaft may be rotated at a speed that is continuously variable within limits.

7. A variable-speed gear according to claim 6, in which said means whereby said casing is rotatably connected with said driven differential wheel and said means whereby said carrier is rotatably connected with said driven shaft, comprises shafts and gear wheels.

8. A variable-speed gear according to claim 6, in which said driven differential wheel drives said member through a sliding connection, said member being adjusted by means of an eccentric device rotated by a shaft passing coaxially through said driven differential wheel.

9. A variable-speed gear according to claim 6, wherein said means rotatably connecting said casing with said driven differential wheel comprises a gear wheel freely rotatable on said driven shaft, articulated means connecting for rotation said casing with said gear wheel, a gear wheel connected to said driven differential wheel, and a shaft parallel to said driven shaft, said shaft carrying gear wheels meshing with said freely rotatable gear wheel and said gear wheel driven by said differential driven wheel.

10. A variable-speed gear according to claim 6, wherein said means for rotatably connecting said rotary carrier with said driven shaft comprises a gear wheel fixed on said driven shaft, a gear wheel fixed on said rotary carrier, a shaft arranged parallel to said driven shaft and gear wheels on said last-mentioned shaft meshing respectively with said gear wheel and said driven shaft, and said gear wheel on said rotary carrier.

11. A variable-speed gear according to claim 6, in which said driving shaft, a shaft connecting said driven differential wheel with said member, and said driven shaft, are mounted coaxially in bearings in a common frame.

12. A variable-speed gear comprising driving and driven shafts, a differential gear including driving and driven wheels and at least one planet wheel engaging them and mounted on a rotary carrier, a member carrying an epicyclic gear including an internally toothed rotatable ring and a planet pinion engaging in the internal teeth of said ring, means whereby said member is driven from said driven differential wheel, means whereby said toothed ring is rotatably connected with said driven differential wheel, and means whereby said rotary carrier is rotatably connected with said driven shaft, said member being adjustable so as to bring either said planet pinion or said toothed ring coaxial with said driven shaft and into any intermediate position whereby said driven shaft may be rotated at a speed that is variable continuously within limits.

13. A variable-speed gear according to claim 6, in which said driven differential wheel is coaxial with said driven shaft, and said driven differential wheel drives said member through a sliding connection, said planet pinion being connected to said driven shaft by an articulated shaft.

14. A variable-speed gear including driving and driven shafts, comprising a differential gear including driving and driven wheels and at least one planet wheel engaging them and mounted on a rotary carrier, a member carrying an epicyclic gear, including a toothed ring and a planet wheel engaging it internally, means connecting for rotation one member of said epicyclic gear to the driven shaft, means rotatably connecting the other member of said epicyclic gear to said driven differential wheel, means rotatably connecting said driven shaft and said rotary carrier, and means for driving said member from said driven differential wheel, said member being adjustable so as to bring either said toothed ring or said planet wheel coaxial with said driven shaft or said driven differential wheel and into any intermediate position whereby said driven shaft may be rotated at a speed that is variable continuously within limits.

15. A variable-speed gear comprising a differential gear and an epicyclic gear including at least two continuously interengaging wheels, said differential gear and said epicyclic gear both being connected to the driven shaft, means whereby said epicyclic gear acts on part of said differential gear, means whereby said two interengaging wheels are respectively directly and indirectly acted upon by the resistive torque of the driven shaft, means for transmitting drive from and to said epicyclic gear, said epicyclic gear being adjustable so that, corresponding to either of two limiting adjustments, either of said wheels may be made coaxial with either of said last-mentioned means, the coaxial wheel remaining stationary while the eccentric wheel rolls on it, while in intermediate adjustments a simultaneous rolling of the two wheels with respect to one another takes place to an extent corresponding to the extent of their eccentricity, whereby said driven shaft may be rotated at a speed that is continuously variable within limits.

16. A variable-speed gear comprising driving and driven shafts, a differential gear including driving and driven wheels and at least one planet wheel engaging them and mounted on a rotary carrier, a member carrying an epicyclic gear including at least two continuously interengaging wheels, means connecting for rotation one of said interengaging wheels with said driven shaft, means for driving said member from said driven differential wheel, and means rotatably connecting the other of said interengaging wheels with said driven differential wheel, said member being adjustable so as to bring either said toothed ring or said planet wheel coaxial with said driven shaft or said driven differential wheel and into any intermediate position whereby said driven shaft may be rotated at a speed that is variable continuously within limits.

17. A variable speed gear comprising a driving shaft, a driven shaft, a differential gear and an epicyclic gear interconnected therewith extending between said driving and driven shafts, said last-mentioned epicyclic gear composed of two circular gear members in permanent rolling engagement one within another, with the relative eccentricity of said gear members being adjustable.

18. A variable speed gear comprising a driving shaft, a driven shaft coaxial therewith, a differential gear and an epicyclic gear interconnected therewith extending between said driving and driven shafts, said last-mentioned epicyclic gear composed of two circular gear members in permanent rolling engagement one within another, the eccentricity of each of said circular gear members being adjustable with respect to the longitudinal axis of said driving and driven shafts.

19. A variable speed gear comprising a driving shaft, a driven shaft, a differential gear and a rolling epicyclic gear interconnected therewith extending between said driving and driven shafts, said rolling gear including at least two interengaging wheels, a rotatable bearing member for said rolling gear, means for adjusting the eccentricity of said bearing member and thereby that of said interengaging wheels, and means for varying the speed of rotation of said eccentrically adjustable bearing member.

HANS KOHN.